(No Model.)

M. J. WALSH.
VESSEL OR RESERVOIR FOR LIQUIDS OR OTHER MATERIALS.

No. 291,655.          Patented Jan. 8, 1884.

Witnesses:
James R. Bowen.
Alfred L. Brown.

Inventor:
Maurice J. Walsh,
by his attorney,
Edwin H. Brown

United States Patent Office.

MAURICE J. WALSH, OF NEW YORK, N. Y.

VESSEL OR RESERVOIR FOR LIQUIDS OR OTHER MATERIALS.

SPECIFICATION forming part of Letters Patent No. 291,655, dated January 8, 1884.

Application filed March 26, 1883. (No model.)

*To all whom it may concern:*

Be it known that I, MAURICE J. WALSH, of New York, in the county of New York and State of New York, have invented a certain new and useful Improvement in Vessels or Reservoirs for Liquids and other Materials, of which the following is a specification.

This improvement relates particularly to an apparatus which I have used for heating railway-cars and other vehicles. In this apparatus I use vessels having compartments containing acetate of soda, acetate of potash or some other material highly retentive of heat, and a steam-passage leading through the aforesaid compartment. My present improvement is designed for such vessels, but it may be used for various other purposes.

The improvement consists in a vessel composed of two tubes, one within the other, and two heads at the ends, common to both tubes, and to which the tubes are welded, so as to form two compartments, which are separated from each other and from the surrounding atmosphere by hermetically-sealed joints.

Figure 1:
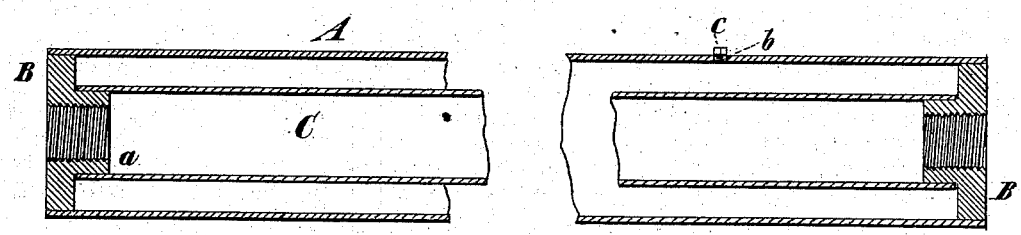
Figure 2:
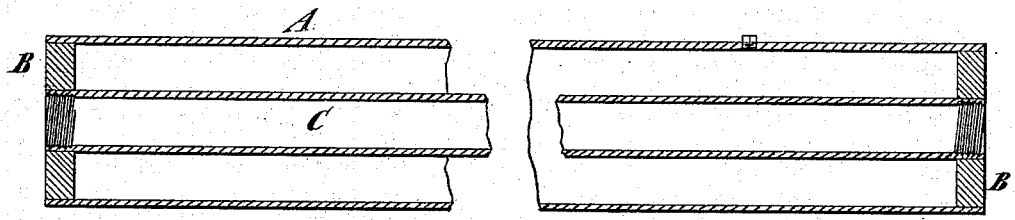

In the accompanying drawings, Figure 1 is a central longitudinal section of a vessel or reservoir embodying my improvement, and Fig. 2 is a similar view of a vessel or reservoir of somewhat modified form.

Similar letters of reference designate corresponding parts in both figures.

A designates a metal tube, which may be round or of any other suitable form; and B designates metal heads fitting in the end portions of this tube. The tube and the heads are to be of such metal that they can be welded together.

C designates another tube, which also may be round or of any other suitable shape. It is smaller than the tube A and arranged inside it. It either fits upon flanges or projections *a*, with which the heads B are provided, as shown in Fig. 1, or inside holes in the said heads. This tube C is of such metal that it can be welded, and it is secured to the heads by being welded thereto. The heads are common to both the tubes A C. I thus make a vessel or reservoir which has hermetically-sealed joints, and which is both simple and durable. The vessel thus produced has two compartments, which are separated from each other and from the surrounding atmosphere by hermetically-sealed joints. The heads, as shown in Fig. 1, or the ends of the tubes C, as shown in Fig. 2, will have screw-threads tapped in them for the attachment of pipes for conveying to it a heating agent—such, for instance, as steam, air, or water. The space between the tubes and heads is intended to be supplied with a material which will be very retentive of heat, as, for example, acetate of soda or acetate of potash. This material may be introduced before the last welding is done, or it may be introduced through a hole, *b*, fitted with a removable screw-plug, *c*. When the inner tube, C, is fitted inside the heads, it may be re-enforced at the ends by internal bands welded into it.

This vessel or receptacle is advantageous not alone for its simplicity, strength, and durability, but also because it will not be liable to leak at the joints, owing to its being practically one integral structure.

What I claim as my invention, and desire to secure by Letters Patent, is—

1. A vessel consisting of two tubes, one within the other, and two heads at the ends, common to both tubes, and to which the tubes are welded, so as to form two compartments, which are separated from each other and from the surrounding atmosphere by hermetically-sealed joints, substantially as specified.

2. A vessel consisting of heads of metal, a tube welded upon the exterior of the heads, and a tube welded upon flanges extending from the heads, substantially as specified.

MAURICE J. WALSH.

Witnesses:
 T. J. KEANE,
 A. L. BROWN.